US009453968B2

(12) United States Patent
David

(10) Patent No.: US 9,453,968 B2
(45) Date of Patent: Sep. 27, 2016

(54) OPTICAL TOUCH SENSING APPARATUS AND METHOD USING DISTRIBUTED BAND PASS FILTER

(71) Applicant: Albert M. David, Gloucester (CA)

(72) Inventor: Albert M. David, Gloucester (CA)

(*) Notice: Subject to any disclaimer, the term of this patent is extended or adjusted under 35 U.S.C. 154(b) by 307 days.

(21) Appl. No.: 13/956,500

(22) Filed: Aug. 1, 2013

(65) Prior Publication Data

US 2015/0034811 A1 Feb. 5, 2015

(51) Int. Cl.
| | |
|---|---|
| H01J 40/14 | (2006.01) |
| G01J 1/04 | (2006.01) |
| G02B 6/26 | (2006.01) |
| G06F 3/042 | (2006.01) |
| F21V 8/00 | (2006.01) |

(52) U.S. Cl.
CPC ............ G02B 6/264 (2013.01); G06F 3/0421 (2013.01); *G02B 6/0033* (2013.01)

(58) Field of Classification Search
USPC ......... 345/173, 175, 176, 179–183; 250/205, 250/216, 221, 226, 227.11, 227.13, 227.14, 250/227.18, 227.2, 22, 7.21, 227.22, 250/227.23, 227.26, 227.28, 227.31, 250/227.32; 385/129–132, 1, 2, 4, 5, 8, 12
See application file for complete search history.

(56) References Cited

U.S. PATENT DOCUMENTS

| | | | |
|---|---|---|---|
| 5,159,199 A * | 10/1992 | LaBaw | G01J 3/02 250/339.02 |
| 5,605,406 A * | 2/1997 | Bowen | B41J 5/10 345/168 |
| 5,914,709 A | 6/1999 | Graham et al. | |
| 7,099,553 B1 | 8/2006 | Graham et al. | |
| 7,786,983 B2 | 8/2010 | Graham | |
| 8,120,595 B2 * | 2/2012 | Kukulj | G02B 6/1221 345/173 |
| 8,184,108 B2 | 5/2012 | Smits | |
| 2008/0284925 A1 * | 11/2008 | Han | G06F 3/0425 349/12 |
| 2009/0237375 A1 | 9/2009 | Khan et al. | |
| 2010/0302196 A1 * | 12/2010 | Han | G06F 3/0425 345/173 |

OTHER PUBLICATIONS

Office Action from corresponding Canadian Application No. CA2857914 filed Jul. 30, 2014—4 pages.

\* cited by examiner

*Primary Examiner* — Pascal M Bui Pho
(74) *Attorney, Agent, or Firm* — Sturm & Fix LLP

(57) ABSTRACT

The present disclosure relates to optical touch sensing technology. Provided is an apparatus comprising an emitting optical waveguide comprising input and output areas, an emitting optical distributed band pass filter disposed at the output area, a receiving waveguide disposed at a spaced apart location from the emitting waveguide, and a receiving distributed band pass filter at an input area of the receiving waveguide. The apparatus may comprise a tunable light source for cycling through a plurality of frequency bands of light for scanning a length of the waveguides for an obstruction (e.g. a touch). The apparatus may be used in place of the plurality of light source/photo detector pairs found in conventional touch screen devices.

17 Claims, 8 Drawing Sheets

OPTICAL TOUCH SENSING APPARATUS AND METHOD USING DISTRIBUTED BAND PASS FILTER

FIELD OF THE DISCLOSURE

The present disclosure relates generally to optical touch sensing technology, and more particularly to light generation and manipulation for use in optical touch sensing devices.

BACKGROUND OF THE INVENTION

Of various interfaces available for interacting with a computer system, one of the easiest to use and understand is the touch screen. This technology allows a user to simply touch an icon or picture to navigate through the system, display the information the user is seeking, and to enter data. For this reason this technology is widely used in many applications, including desktop computers, tablet computers, mobile devices, bank machines, information kiosks, restaurants, cars, navigation systems, etc.

A number of different methodologies are used to implement touch screen technology, and each has advantages and disadvantages. These methodologies include resistive, capacitive, surface acoustic wave, infrared, and optical.

A contemporary infrared touch screen employs a plurality of light emitting diodes (LEDs), positioned along each axis of a display screen. Each LED emits a beam of light, which is projected across the display. A plurality of photo detectors is positioned on opposite sides of the screen for receiving the light beams from the LEDs. Thus the LED light beams create a matrix or grid of light beams. A touch on the screen blocks at least one light beam on each of the two axes from reaching its corresponding photo detectors. The location of the touch is determined based on a calculated intersection of the two or more obstructed light beams.

Infrared and other LED matrix touch screen input systems, however, suffer from numerous disadvantages. For example, a contemporary infrared touch screen input system has about 40 or more LEDs and photo detectors along each axis. Therefore these contemporary systems employ many discreet components, and these many components have to be connected to a controller. These many components and interconnections take up a lot of space around the perimeter of a display, making it difficult to incorporate such systems into displays and particularly small displays, such as displays in hand held devices. Another problem is that due to the large number of components needed, the technology is more susceptible to individual component failures. Failures can cause the touch screen to stop functioning partially or fully. In addition, the high number of components tends to make such touch screen input devices very complicated and expensive. A further consideration is the power consumption of a touch input system. Systems having a lot of components, for example one or more arrays of LEDs, require more power to operate all the components. Another problem of this type of technology is that it provides for relatively poor touch-sensing resolution due to the large width of individual light beams employed. As a result, touches to the display by objects having a small footprint, such as a stylus, may not be sufficient to register as a touch on the display, for example because the object is too narrow to fully block an LED beam of light. Yet a further problem with LED touch screen input devices is that the miniaturization of this type of touch screen is not practical for small format applications. Again, the number and size of the components makes it very difficult if not unfeasible to adapt this technology to small format applications.

For the foregoing reasons, it can be appreciated that a need exists for a compact, inexpensive, and simple apparatus that may be used in a touch input device for a touch screen display system.

SUMMARY OF THE INVENTION

According to one aspect, the present disclosure provides an apparatus comprising: an emitting optical waveguide comprising an input area and an output area; an emitting distributed band pass filter disposed at the output area of the emitting optical waveguide; a receiving optical waveguide comprising an input area and an output area, the receiving optical waveguide disposed at a spaced apart location from the emitting optical waveguide and orientated such that when light exits the output area of the emitting optical waveguide light is directed at the input area of the receiving optical waveguide; and a receiving distributed band pass filter disposed at the input area of the receiving optical waveguide.

According to another aspect, the present disclosure provides a method comprising: projecting light of a specific frequency band from a tunable light source into an input area of an emitting optical waveguide; changing the frequency band of the projected light over time; filtering light exiting an output area of the emitting waveguide using an emitting optical distributed band pass filter; filtering light at a spaced apart location from the emitting waveguide using a receiving optical distributed band pass filter; and receiving light that has passed though the receiving distributed band pass filter with a receiving optical waveguide.

According to another aspect, the present disclosure provides a method comprising: projecting a spectrum of light from a light source into an input area of an emitting optical waveguide; filtering light exiting an output area of the emitting waveguide using an emitting optical distributed band pass filter; filtering light at a spaced apart location from the emitting waveguide using a receiving optical distributed band pass filter; and receiving light that has passed though the receiving distributed band pass filter with a receiving optical waveguide.

BRIEF DESCRIPTION OF THE DRAWINGS

The present disclosure will be better understood having regard to the drawings in which.

DETAILED DESCRIPTION

Figure 1:
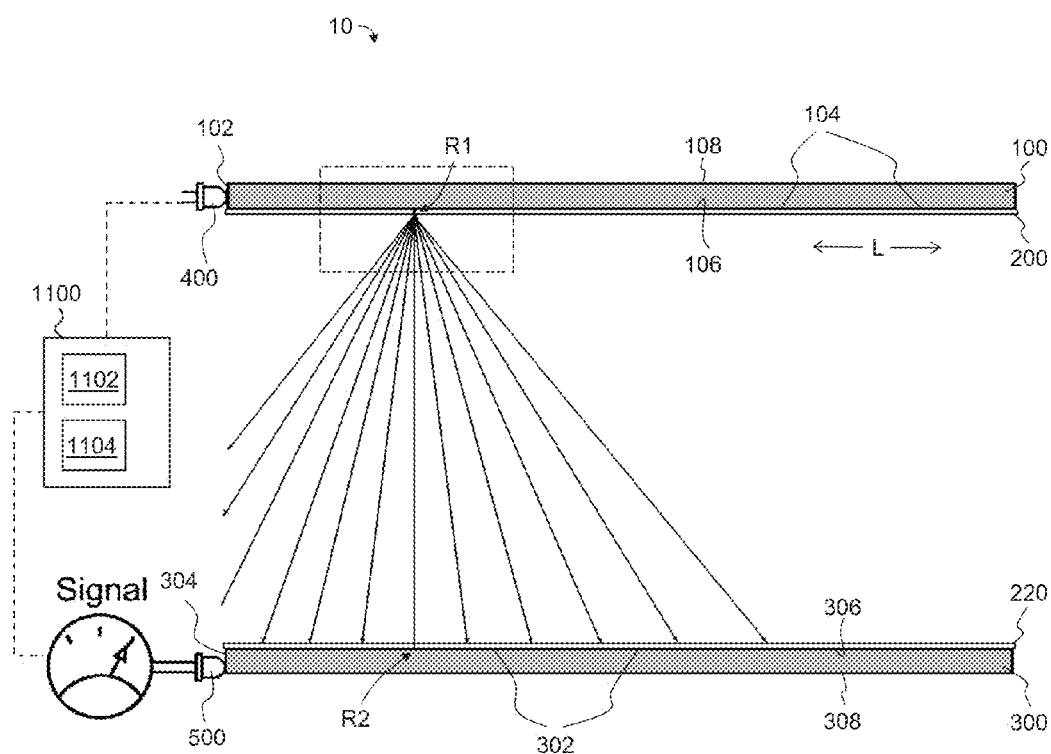
FIG. 1 is a side cross-sectional view of a representation of one embodiment according to the present disclosure.

In one aspect, the present disclosure provides an optical sensing apparatus comprising one or more waveguides and one or more optical distributed band pass filters in the place of the conventional plurality of LED/photo detector pairs. The term "distributed band pass filter" is used herein to refer to a filter having a central wavelength of operation that shifts physical position along a length or other dimension of the filter. A plurality of individual LEDs or other light emitting sources, possibly disposed along one or more edges of a display or other input device, may be replaced with one or more central light sources, a waveguide and at least one distributed band pass filter. Similarly, a plurality of individual photo detectors, possibly disposed along one or more opposing edges of a display or other device, may be replaced with one or more central photo detectors, a waveguide and at least one distributed band pass filter. In other words, one or more waveguides and distributed band pass filters may replace the usual plurality of light sources and/or photo detectors in a touch sensing system.

In particular, the present disclosure provides an apparatus comprising an optical waveguide having at least one input and at least one output area, and an optical distributed band pass filter disposed at or proximate the output area of the waveguide so that the filter is located in the optical path of light exiting the output area. When light having a particular frequency falling within a spectral range of the filter exits the waveguide at the output area, the filter allows only a band of light to pass therethrough at a physical position or region along the length of the filter that corresponds to the particular frequency of the light. Thus when light consisting of a specific frequency or narrow frequency band is directed at a distributed band pass filter, light generally only passes through the filter at a location or region of the filter that corresponds to the particular frequency or frequency band. The light is generally blocked by the filter in all other locations or regions of the filter. Accordingly, as the frequency of the light is changed, the position of the light passing through the filter changes. On the other hand, when light consisting of a broader frequency band is directed at a distributed band pass filter, light of a particular frequency within the band only passes through the filter at a region of the filter that corresponds to the particular frequency. The light of the particular frequency within the band is generally blocked by the filter at all other regions of the filter. Using an example where the broader frequency band consists of the entire visible spectrum of light (e.g. white light) and where the operational bandwidth of the filter also spans the visible spectrum, light passing through and exiting a distributed band pass filter will have the form of a rainbow since the filter only allows light of a specific frequency (e.g. colour) to pass through at a given location or region of the filter.

The preceding only describes some characteristics of optical distributed band pass filters. Other properties and characteristics of such filters are known to persons skilled in the art.

The present disclosure also provides an apparatus comprising an optical waveguide, for example a receiving optical waveguide, having at least one input and output area, and an optical distributed band pass filter disposed at or proximate the input area of the waveguide so that the filter is located in the optical path of light entering the input area of the waveguide. When light external to the waveguide having a particular frequency falling within a spectral range of the filter is received at the filter, the filter allows only a band of light to pass therethrough, and thus into the waveguide, at a physical position along the length of the filter that corresponds to the particular frequency of the light. Accordingly, the position of the light passing through the filter changes as the frequency of the light is changed.

The present disclosure further provides an optical sensing apparatus comprising an emitting waveguide, a receiving waveguide spaced apart from the emitting waveguide, at least one optical distributed band pass filter disposed at or proximate at least one of the waveguides, a tunable light source for emitting light into the emitting waveguide, and a photo detector for detecting light at the receiving waveguide. The apparatus may be used in an optical touch screen system or other touch input system to detect a single axis position of a touch. For example, an input device such as touch screen, button, or keypad may be positioned in the space between the emitting and receiving waveguides.

The present disclosure further provides an apparatus comprising two or more optical sensing apparatuses, for example the apparatus described in the previous paragraph. Such an apparatus may be used in an optical touch screen system or any other touch input system. For instance, the two apparatuses can be oriented so that the first apparatus detects the position of a touch along a first axis and the second apparatus detects the position along a second axis. These two positions can be used to determine the coordinates of the touch (e.g. x-y coordinates) on a screen in a touch screen system.

While the devices, apparatuses, methods and systems described herein are described in relation to optical touch screen technology, the scope of the present disclosure is not intended to be limited to touch screen technology. The present devices, apparatuses, methods and systems may be used for other applications and in other fields, including but not limited to touch input systems and devices such as buttons, keypads, and track pads.

The various features and components of the present disclosure are now described with reference to the Figures.

Figure 2:
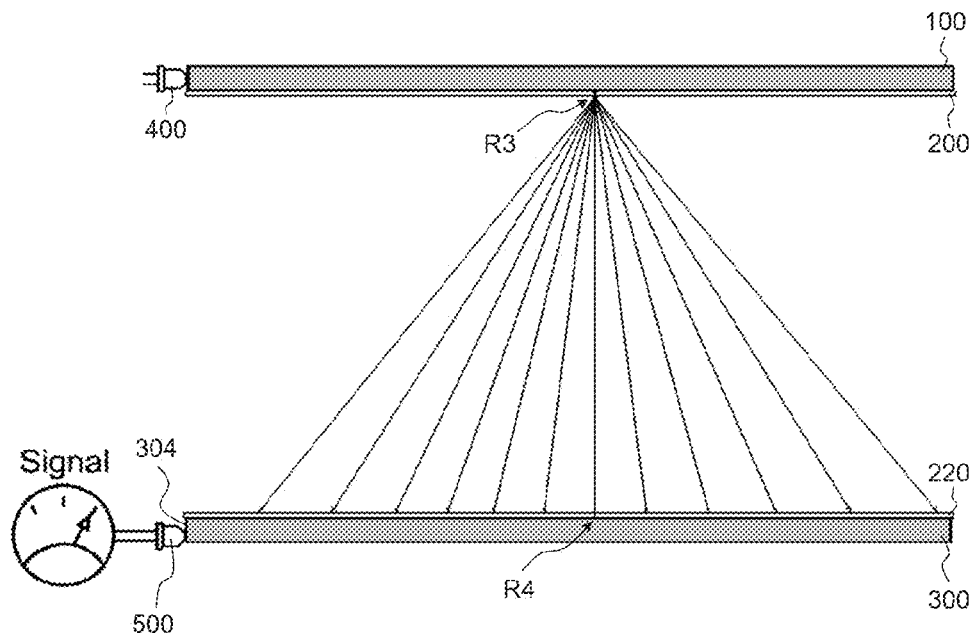
FIG. 2 is a side cross-sectional view of the embodiment shown in FIG. 1 in which light within the emitting waveguide passes through the distributed band pass filter at a different physical region.
Figure 3:
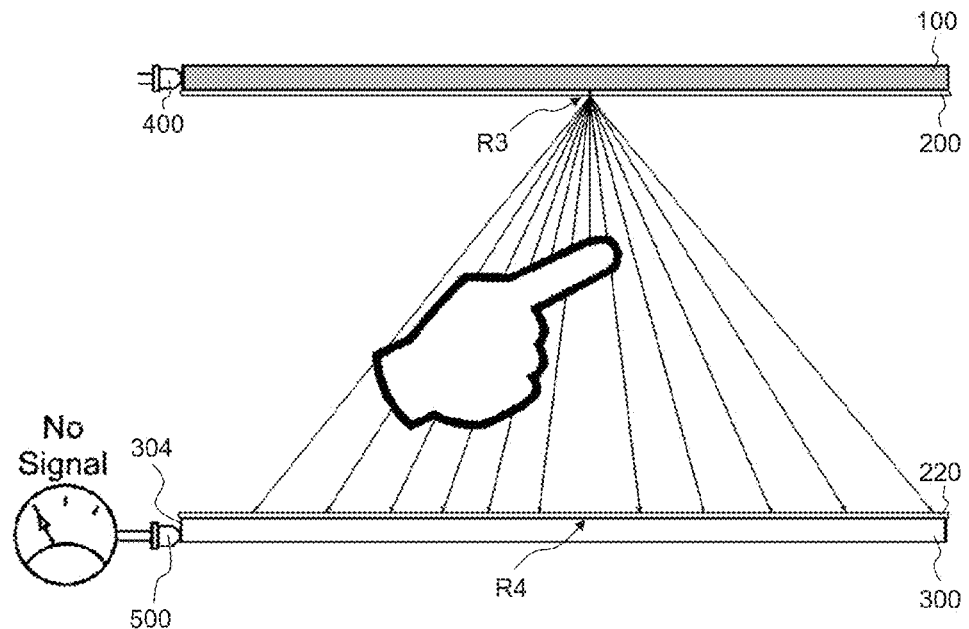
FIG. 3 is a side cross-sectional view of the embodiment shown in FIG. 2 except in that the light traveling between the waveguides is partially obstructed.

FIGS. 1 to 3 show one embodiment of an optical sensing apparatus 10 according to the present disclosure. Apparatus 10 generally comprises an emitting waveguide 100, a receiving waveguide 300 disposed at a spaced apart position from emitting waveguide 100, and at least one optical distributed band pass filter 200, 220. Apparatus 10 also comprise a tunable light source 400 and a photo detector 500. Light source 400 may be of any suitable type, including a source having one or more LEDs, laser diodes, or any other suitable light emitting mechanism. Light source 400 may be tunable in any suitable way, including in terms of one or more of frequency (e.g. spectrum), intensity, and spectral bandwidth. In at least one embodiment, light source may be tunable in terms of frequency and may be capable of emitting or projecting a light of specific frequencies or narrow frequency bands. For example, a light source may be capable of projecting light having a frequency band having a width of approximately 3 nm within the range of 500 nm to 900 nm. In other words, the center frequency of the projected light band may be tuned (varied) to values lying in the range of 500 nm to 900 nm. The preceding values are merely examples used to explain a tunable light source, and are not intended to be limiting.

In use, one or more input devices, such as a display, button, keypad, or graphic entry device, can be disposed partially or wholly between the emitting and receiving waveguides.

In operation, a touch to the sensing apparatus generally creates an obstruction of light from an emitting waveguide to a receiving waveguide. A position of the touch along an axis can be determined by calculating the position of the caused obstruction. A touch to a sensing apparatus is shown in FIG. 3.

Figure 4:
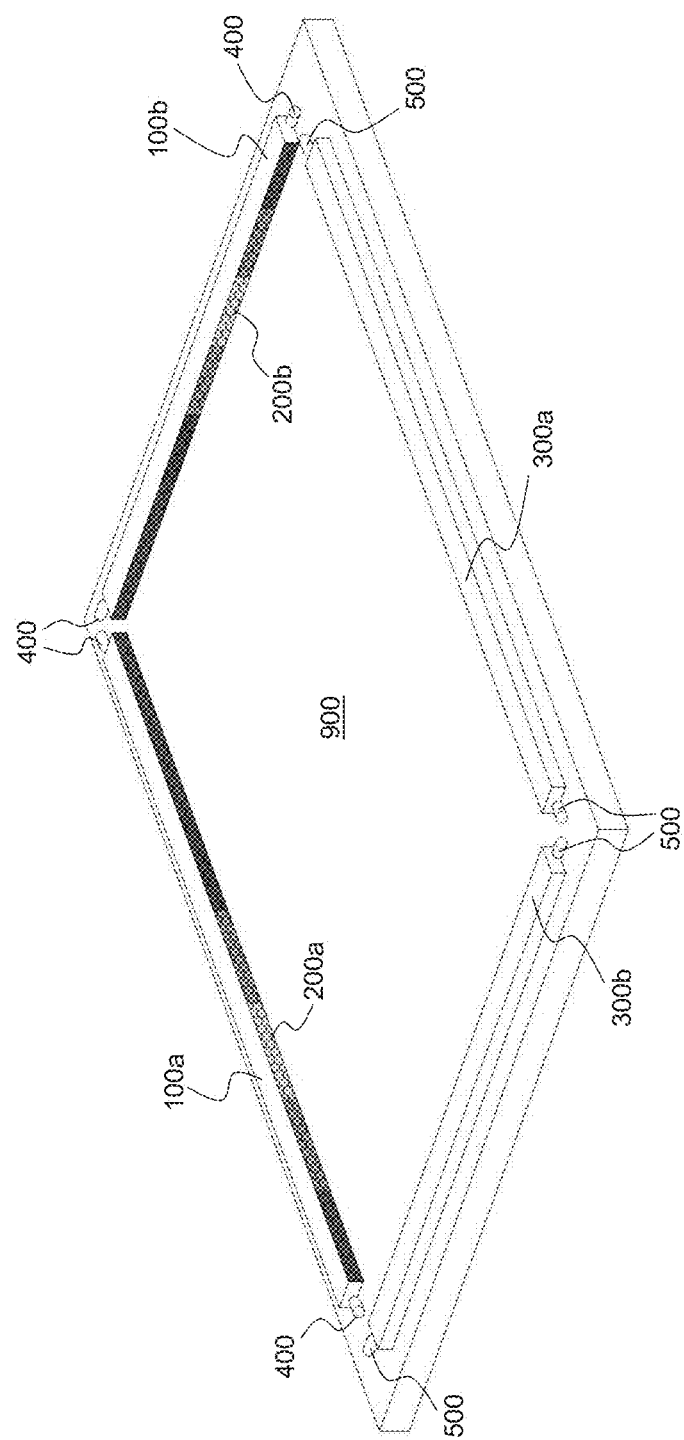
FIG. 4 is a perspective view of one embodiment of an optical sensing apparatus disposed on an optical substrate.
Figure 5:
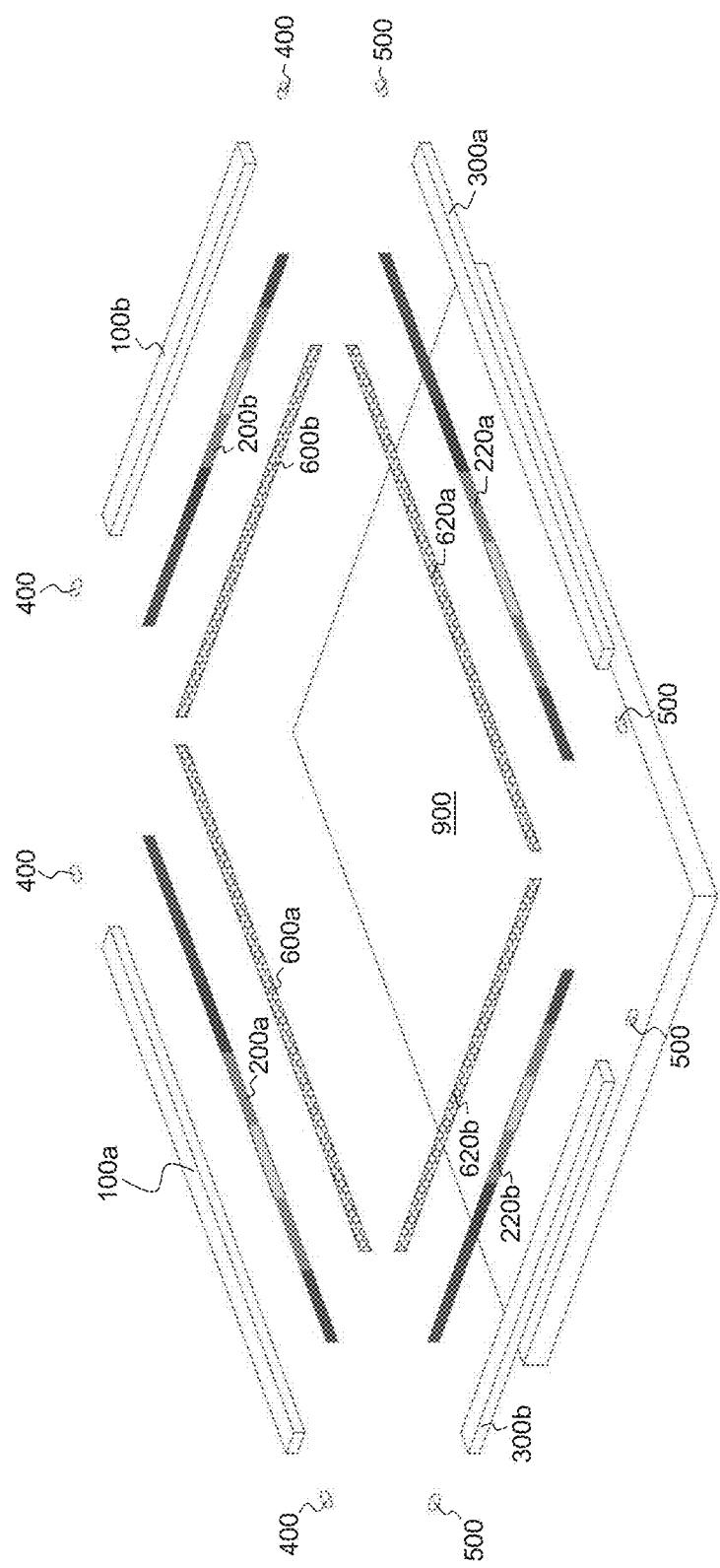
FIG. 5 is an exploded view of the apparatus shown in FIG. 4.
Figure 6:
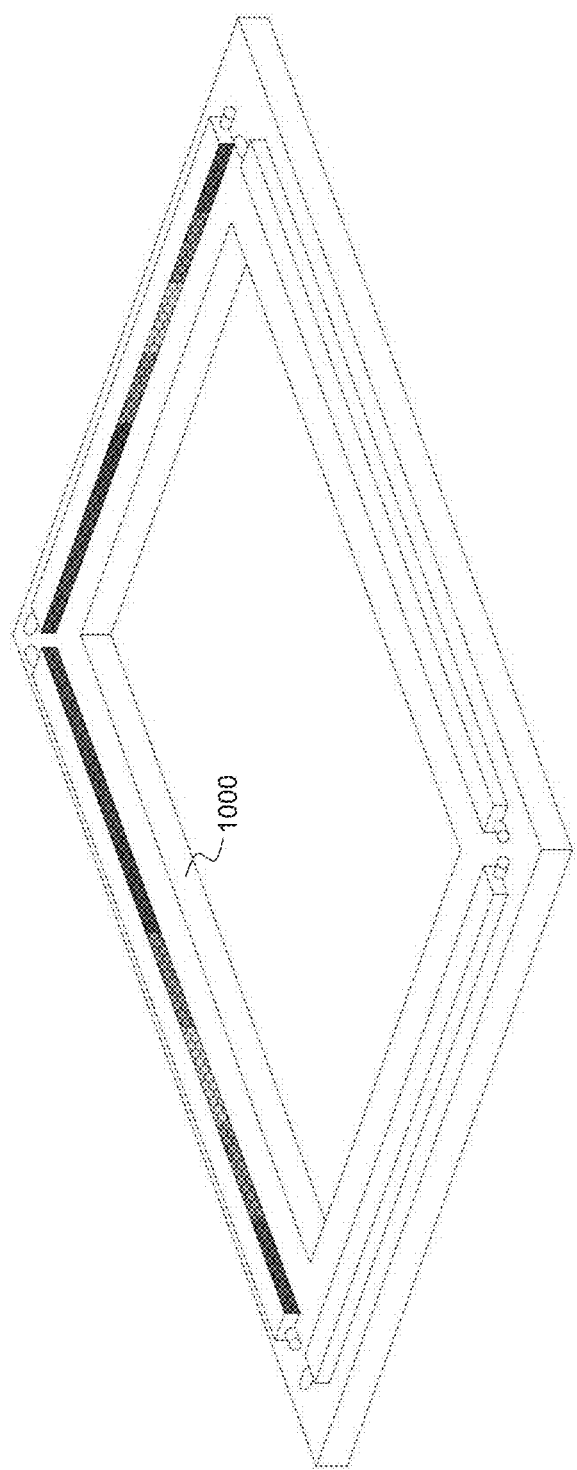
FIG. 6 is a perspective view of another embodiment of an optical sensing apparatus disposed on a mounting frame.

FIGS. 4 to 6 show embodiments each having two sensing apparatuses arranged more or less perpendicularly to one another so that one apparatus detects the position of a touch along a first axis (e.g. X axis) and the other apparatus detects the position along a second axis (e.g. Y-axis). FIGS. 4 and 5 show a first embodiment in which the sensing apparatuses are disposed around an optical substrate 900, for example a screen of a display. FIG. 6 shows an embodiment similar to the one shown in FIGS. 4 and 5 in which the sensing apparatuses are disposed around a mounting frame 1000 instead of on an optical substrate. In at least one embodiment, a mounting frame may be positioned above or on top of a display and possibly under a bezel, frame or other housing of the display.

In FIGS. 1 to 3 and 7 to 9, light exiting emitting waveguide 100 is represented by straight lines having one or more arrowheads where the arrowheads indicate the direction of travel of the light. In addition, light within waveguides 100, 300 is represented by grey shading. For example, waveguides 100, 300 in FIGS. 1 and 2 have light within. In contrast, waveguide 300 in FIG. 3 has very little or no light therein since the light traveling from waveguide 100 is obstructed.

In the embodiment shown in FIGS. 1 to 3, light having a specific frequency or frequency band from tunable light source 400 enters emitting waveguide 100 at an input area 102 of waveguide 100. The expression "frequency band" as used herein does not exclude bands below a certain width or size. In other words, the expression may include very narrow frequency bands. The light within waveguide 100 is then reflected or otherwise directed outwardly of the waveguide at an output area 104, which is partially or wholly situated at front side 106 of the waveguide. Waveguide 100 is orientated so that front side 106 generally faces corresponding front side 306 of receiving waveguide 300.

Although FIGS. 1 to 3 show a single light source 400, apparatus 10 can comprise two or more light sources. In addition, FIGS. 1 to 3 show light source 400 disposed at one end of waveguide 100. However, the one or more light sources can be situated at any suitable position or positions relative to waveguide 100. For example, a second light source could be situated at the opposing end the waveguide. Alternatively, one or more light sources could be situated at back side 108 of the waveguide. Other orientations and configurations are possible.

Waveguide 100 may be of any suitable type and form, and may generally be capable of conducting light along its length, for example as shown in FIG. 1. The waveguide may consist or comprise of plastic or glass, or any other suitable material or materials. In addition, waveguide 100 may comprise means for reflecting light within the waveguide outwardly of the waveguide. In at least one embodiment, the reflecting means is situated or disposed at or near back side 108 of waveguide 100. The reflecting means can be of any suitable type, including but not limited to a coating, etching or some other treatment of an outer surface of back side 108 of waveguide 100 for reflecting or otherwise directing light within the waveguide outwardly of the waveguide at front side 106. As shown in FIGS. 1 to 3, in at least one embodiment, the reflecting means reflects the light within waveguide 100 outwardly of the waveguide in a generally perpendicular direction relative to the general direction in which the light travels along the length of waveguide 100. However, in one or more other embodiments, the reflecting means may reflect the light at a different angle or angles (i.e. not 90 degrees).

In at least one embodiment, one or more of the waveguides may comprise or consist of opaque or crystalline glass, opaque or crystalline plastic, or any other suitable opaque or crystalline optical material(s).

An optical distributed band pass filter 200 may be disposed at or proximate output area 104 of emitting waveguide 100 so that light exiting the waveguide is received at the filter. Again, "distributed band pass filter" is used herein to mean a filter having a center wavelength of operation that shifts or varies physical position along the filter, for example along a length L of the filter, depending on the frequency of the light. Accordingly, when light having a particular frequency falling within a spectral range of filter 200 exits waveguide 100, the filter allows only light to pass therethrough at a physical position or region along length L of the filter that corresponds to the particular frequency of the light. As the frequency of the light entering emitting waveguide 100 is changed, the physical position or region of the band of light that is permitted to pass through distributed band pass filter 200 progresses in along the length L of the filter.

In at least at one embodiment, one or more distributed band pass filters may be linear distributed band pass filters, meaning that the physical position of the central wavelength of operation changes linearly with a change in the frequency of the light. However, in one or more other embodiments, other optical distributed band pass filters including non-linear filters may be used.

Figure 1A:
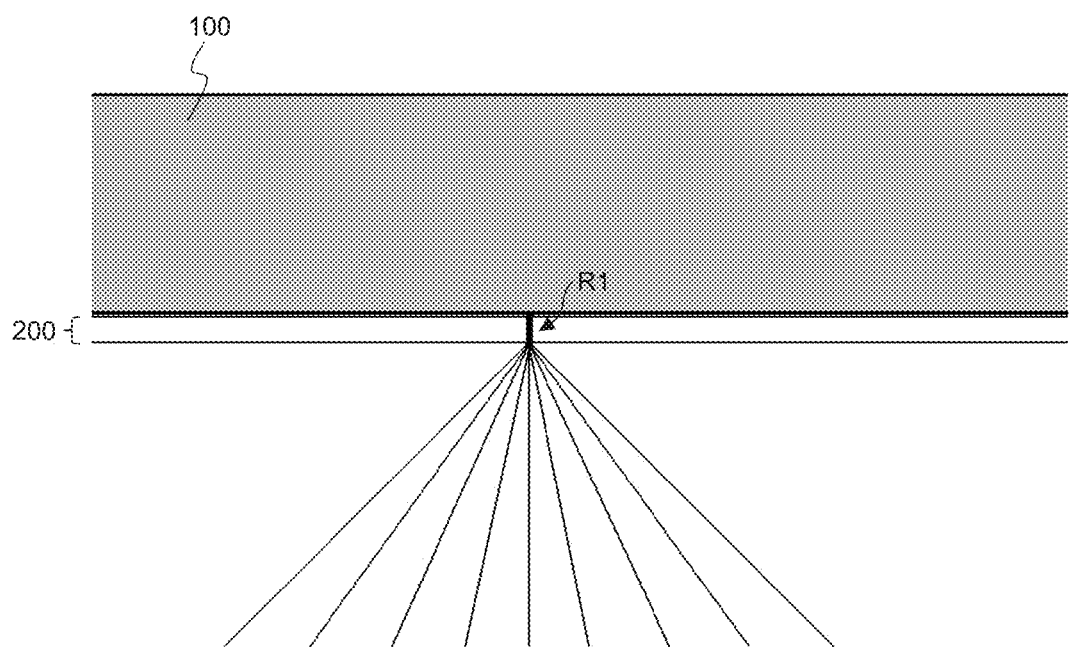
FIG. 1A is a close-up view of the area indicated by the broken line in FIG. 1.

In FIG. 1, light emitted from source 400 has a frequency or narrow frequency band F1. Filter 200 allows the light having frequency F1 to pass therethrough in region R1 of the filter. In other words, filter 200 blocks the light in all other regions except for region R1. The word "block" is used herein to mean either fully or partially blocking. In this embodiment, the light exits filter 200 in a triangular or conical shape, as indicated by the lines terminating with arrowheads. FIG. 1A shows a close-up view of the area of FIG. 1 where light exits emitting waveguide 100 and passes through filter 200. As shown in FIG. 1A, light having frequency F1 only passes through filter 200 at region R1.

As described above and shown in FIG. 1, optical sensing apparatus 10 may also comprise receiving waveguide 300 disposed at a spaced apart location from emitting waveguide 100. Receiving waveguide 300 comprises at least one input area 302 and at least one output area 304. In at least one embodiment, receiving waveguide 300 can be similar or identical to emitting waveguide 100. In the embodiment shown in FIGS. 1 to 3, receiving waveguide 300 is adapted to receive light that emanates from emitting waveguide 100 and through filter 200. Therefore the length of output area 104 may be similar or the same as the length of input area 302. However, the lengths of output area 104 and input area 302 need not necessarily be similar or the same.

Once the light has entered receiving waveguide 300 at input area 302, it may then be reflected or otherwise directed outwardly of the waveguide at output area 304, possibly to one or more photo detectors 500. In at least one embodiment, photo detector 500 could be disposed partially or fully within receiving waveguide 300.

In at least one embodiment, as shown in FIG. 1, apparatus 10 can also comprise a receiving optical distributed band pass filter 220 disposed at or proximate input area 302 of receiving waveguide 300 so that when light external to the receiving waveguide having a particular frequency is received at the filter, the filter allows only a band of light to pass therethrough, and thus into receiving waveguide 300, at a physical position or region along the length of the filter that corresponds to the particular frequency of the light. This region is indicated as region R2 in FIG. 1. Accordingly, filter 220 may be similar or the same as filter 200 described above. As the frequency of the light hitting distributed band pass filter 220 is changed, the physical location or region of the band of light that is allowed to pass through filter 220 progresses in the direction of the length L of the filter. In the embodiment shown in the Figures, the physical location or region of the band of light that is allowed to pass through each of filters 200 and 220 progresses in the same general direction as the frequency of the light is changed. For example, as shown in FIGS. 1 and 2, the physical location changes from the left (FIG. 1) to the right (FIG. 2) as the frequency of the light being input into emitting waveguide 100 is changed.

In at least one embodiment, as shown in the Figures, filters 200 and 220 will be aligned so that the center wavelengths of operation of each filter may be situated directly opposite one another. For example, with reference to FIG. 2, central wavelength of operation W2 of filter 200 is situated at region R3 in filter 200. Central wavelength of operation W2 of filter 220 is situated at region R4 in filter 220, which is located directly opposite region R3 in filter 200. Accordingly, when the optical path between R3 and R4 is unobstructed, light from emitting waveguide 100 reaches filter 220 and passes therethrough only at region R4. The light reaching filter 220 at other regions is blocked by the filter and is thus prevented from entering waveguide 300. Once the light passes through region R4 of filter 220, the light enters input area 302 of waveguide 300, travels through the waveguide, and exits the waveguide at output area 304. Light exiting waveguide 300 can be detected by photo detector 500.

On the other hand, as shown in FIG. 3, when the path between R3 and R4 is obstructed, the light from emitting waveguide 100 does not reach region R4 and thus does not enter receiving waveguide 300. Accordingly, photo detector 500 detects little or no light at output area 304 of receiving waveguide 300. A touch screen system may interpret this information to mean that the screen has been touched at at least one point along an axis corresponding to the path between R3 and R4.

In operation, the frequency of the light being produced by tunable light source 400 and traveling into input area 102 of emitting waveguide 100 can be transitioned or cycled through numerous different values or frequency bands within a specific frequency range with the result that the position of the band of light passing through filter 200 changes over time. This is herein referred to as "scanning".

The scanning can be controlled in any suitable way, for example by a processor of a system. In at least one embodiment, the frequency of the light may start at the low end of the band pass value of distributed band pass filter 200 and in time progress to the high end value of the filter. In another embodiment, the frequency of the light may start at the high end value and in time progress to the low end value of filter 200. For example, in the case of an embodiment employing visible light, the light source may start at red and progress through the rainbow colors to blue, or vice versa. Furthermore, the progression may be linear or non-linear in time. In addition, once the progression is complete, the light may be returned to its original starting frequency value and the progression can be re-started. In another embodiment, the frequency of the light may progress in reverse back to its original starting value. Other options are possible.

The above described scanning can be used, for example, to scan a part or a full length or width of a display in a touch screen system. Such a cycle can be continuously repeated at any suitable frequency to provide continuous scanning of the desired area. The frequency can be any suitable frequency that provides a satisfactory sensing time in a touch screen system. For example, if the scanning frequency is too low, there may be an undesirable lag in the reporting of a touch on the screen and/or a quick touch may not be detected. In at least one embodiment, light source 400 can progress through the specific frequency range at approximately 100 cycles per second. However, any other suitable frequency may be used.

To achieve the operation described above, in at least one embodiment the specific frequency range in which the tunable light source cycles will match or substantially overlap the spectral range of at least distributed band pass filter 200. In other words, the spectral output of the light source will substantially match or at least substantially cover the spectral range of distributed band pass filter 200.

The distributed band pass filter 200 may be of any suitable type and may have any suitable form. For example, filter 200 may be integrated with the waveguide. For instance, filter 200 can be in the form of a coating, film or other layer applied to output area 104 of emitting waveguide 100. Filter 200 could alternatively be in the form of a film, plate or other element or elements that are disposed at or proximate output area 104. Regardless of its form, filter 200 is generally to be disposed in the optical path of some or all of the light exiting output area 104 of emitting waveguide 100.

The contents of the preceding paragraph also apply to receiving filter 220 except in that the receiving filter would be disposed at or proximate input area 302 of receiving waveguide 300.

In at least one embodiment, filter 200 and/or 220 may be an infrared filter having a spectral range of approximately 850 to 950 nm and a band pass bandwidth of approximately 2 to 3 nm. However, in other embodiments, filter 200 and/or 220 may have different ranges and/or band pass bandwidths. In other words, none of these values or ranges is intended to be limiting.

Furthermore, tunable light source 400 may be any suitable source. In at least one embodiment, light source 400 may be an LED light source comprising one or more LEDs to produce a spectral output that covers the spectral range of distributed band pass filter 200. The desired spectral output range of light source 400 may be obtained by mixing the colors or frequencies of the one or more individual LEDs by varying their individual intensities. This can be similar to the way a computer or television display mixes red, green and blue (RGB) to obtain a range of visible light colors. However, it is to be appreciated that any suitable light source may be used that can produce the desired varying spectral output. In addition, as mentioned above, two or more light sources may be used.

In at least one embodiment, the spectral output range generated by variable light source 400 may fall partially or wholly in the infrared spectrum (i.e. a wavelength in the range of 750 nm to 1 mm). However, this spectral output range is not intended to be limiting. The spectral output range can be any suitable range, and can fall in one or more other spectrums including but not limited to the visible spectrum (390 nm to 750 nm) and the ultraviolet spectrum (10 nm to 390 nm). Again, the spectral output range may cover part or all of the spectral range of distributed band pass filter 200.

In addition, in at least one embodiment, the bandwidth of the light emitted by light source 400 need not be extremely narrow, but may only have a bandwidth peak that can be differentiated by distributed band pass filter 200. The bandwidth peak is differentiable by the filter if there is a point along an axis of the filter where the light is most intense. In one embodiment, the bandwidth of the light emitted by the light source can be approximately 1000 nm, but this is just an example and not meant to be limiting.

A narrower bandwidth of light emitted from the light source may result in a better resolution of a touch point on a display. Resolution refers to the precision with which the location of a touch can be determined. For example, smaller touches, e.g. of a stylus, can be detected since the width of the beam that must be obstructed is narrower. In addition, a distributed band pass filter can narrow the bandwidth of light emitted by the light source, which may also provide a better resolution. However, even with a wider beam, a partial obstruction of the light coupled with the duration of the dip through the scanning cycle may also be used to determine the size of an object used to effect a touch (e.g. obstruction). Such ability may be beneficial for application programmers. For example, on a smart phone or other computing device, if the phone or device knows a person is touching with a finger or a stylus, it can then display the appropriate small or large format keyboard on the display for ease of use.

As mentioned above, apparatus 10 may also comprise at least one photo detector 500 for detecting light at receiving waveguide 300. The term "photo detector" is used herein to mean a detector having one or more photodetector or photosensor elements. In other words, "photo detector" is not limited to a single photodetector or photosensor element. In some embodiments, a detector may comprise two or more photodetector elements. In at least one embodiment, detector 500 may be able to detect and/or measure the intensity of light it receives. In one or more other embodiments, the photo detector may be capable of detecting and/or measuring a variation in amplitude of received light. In addition, in at least one embodiment, the spectral range of the photo detector will cover at least the spectral range of distributed band pass filter 220, which in the presently described embodiment is the same or similar to spectral range of distributed band pass filter 200 at receiving waveguide 100.

Furthermore, although the embodiment shown in FIGS. 1 to 3 comprises a single photo detector 500, any suitable number of detectors may be used. In addition, the one or more detectors may be situated at any suitable location relative to receiving waveguide 300. Photo detector 500 is shown in FIGS. 1 to 3 at one end (left end in the Figures) of waveguide 300 at or proximate output area 304 of waveguide 300. Detector 500 is therefore in the optical path of light exiting output area 304. However, the detector could be situated on the opposite end of the waveguide. In another embodiment, one or more photo detectors could be disposed at both ends of waveguide 300 and/or at back side 308 of the waveguide. Examples embodiments having light sources and/or photodetectors at both ends of waveguides are shown in FIGS. 4 to 6. However, other configurations are possible.

In at least one embodiment, a touch or a non-touch of a display at a specific location or region along a single axis of the display can be determined as follows. At a particular moment in time, the frequency of the light being emitted from light source 400 into emitting waveguide 100 is known and corresponds to a physical position or region in both distributed band pass filters 200 and 220. For example, specific frequencies can be mapped to physical locations along a filter. As previously described, in at least one embodiment, the regions are situated directly opposite one another. When light is received at receiving waveguide 300, and thus at photo detector 500, this can be interpreted to mean that there is no obstruction (e.g. the screen is not being touched) along a line or band (i.e. axis) extending between emitting and receiving waveguides at the physical position or region corresponding to the frequency of the light. On the other hand, when light is not received at receiving waveguide 300, and thus not detected at photo detector 500 (or the intensity of the detected light is below a specific threshold), this can be interpreted to mean that there is an obstruction (e.g. the screen is being touched) along the line or band extending between the emitting and receiving waveguides at the particular position or region. Since the frequency of the light is known at the time of the obstruction and the frequency corresponds to a physical position or region in both distributed band pass filters 200 and 220, the physical position of the single axis of the touch on the screen can be determined.

The present disclosure also provides a touch input apparatus that comprises two or more sensing apparatuses, such as apparatus 10 described above. In at least one embodiment having two such apparatuses, the two apparatuses can be oriented relative one another so that the first apparatus detects the position of a touch along a first axis and the second apparatus detects the position along a second axis. As mentioned above, many existing prior art touch screen display systems employ two emitting/receiving arrangements for detecting a touch along two different axes. The two positions can be used to determine the coordinates of a touch (e.g. x-y coordinates) on a screen or other touch input device. The waveguides of the first and second apparatuses can be positioned around a display screen in any suitable way, including by mounting to a frame or optical substrate panel (e.g. glass, plastic, etc.) of the display.

One embodiment of a touch input apparatus having two sensing apparatuses is shown in FIGS. 4 and 5. This embodiment comprises first emitting waveguide 100*a* and first receiving waveguide 300*a*, and second emitting waveguide 100*b* and second receiving waveguide 300*b*. The waveguides may be disposed generally around the perimeter of a base, here in the form an optical substrate 900. Optical substrate 900 may be a screen of a display, or part of some other input device. It is to be appreciated however that the waveguides need not necessarily be positioned at the perimeter of a base or other structure. Other orientations of the waveguides about a base or other structure are possible.

The embodiment further comprises distributed band pass filter 200*a* at first emitting waveguide 100*a*, and distributed band pass filter 200*b* at second emitting waveguide 100*b*. In addition, one or more light sources 400 may be disposed at emitting waveguides 100*a*, 100*b*, and one or more photo detectors disposed at receiving waveguides 300*a*, 300*b*.

FIG. 5 shows an exploded view of the touch input apparatus of FIG. 4. As shown in FIG. 5, the touch input apparatus may include distributed band pass filter 220a at first receiving waveguide 300a, and distributed band pass filter 220b at second receiving waveguide 100b. In addition, as shown in FIG. 5, the touch input apparatus may have one or more collimators disposed inwardly of one or more of the waveguides. A collimator may be used to collimate light that has left an emitting waveguide. This may be used to produce one or more collimated beams of light directed towards an opposing receiving waveguide. In addition, a collimator may be used to collimate light prior to it entering a receiving waveguide. The use of a collimator, angle attenuation filter or other suitable device at the receiving waveguide is described further below.

In at least one embodiment, it may be possible to determine or calculate a touch relative to a third axis (e.g. Z axis). A Z-axis measurement may be used in determining or sensing how hard a user is touching a screen or other input device. For example, a Z-axis position may be determined or calculated using one or both of the level of light being blocked from a touch and the duration of the obstruction of light over the spectral cycle or scanning cycle. In at least one embodiment, the amount of force with which a user touches a screen, etc. may be determined or calculated based on a width of an optical obstruction caused by the touch. For example, with a light touch, the tip of a finger may cause a narrow obstruction of light between opposing sides of a sensing apparatus. However, as the finger is depressed with more pressure, the fingertip may flatten thereby increasing the width of the obstruction. Thus a width of an obstruction caused at a sensing apparatus may be used to determine the amount of pressure with which a touch is applied. The width of an obstruction may be measured along a single axis (e.g. X or Y axis) or along two or more axes (e.g. both X and Y axes). A Z-axis measurement may be used for any suitable purpose or application. For instance, in an industrial controls application, this may be used to adjust the rate of flow on a valve icon by pushing lightly for minimum flow through the valve and pushing harder to increase the flow through the valve. Other uses are possible.

When something other than a bare finger is used to touch a touch input system, a flattening-out effect of a bare finger may not occur. Therefore in a least one embodiment, one or more strain gauge sensors or any other type of suitable pressure detecting sensor that can detect any z axis pressure being applied to a surface of the touch input sensor may be used. For example, one or more strain gauge sensors may be mounted on the back side of the sensor's substrate at any edge so as to be sandwiched in between the sensor's back and the sensor mounting surface of the video display. Z-axis pressure may be detected and measured by the change in the sensor's reading from static to depressed.

Furthermore, the first and second apparatuses may sample or scan for a touch simultaneously, or separately. For example, the first and second apparatuses may alternate in their scanning.

In at least one embodiment, the first and second apparatus will be orientated at approximately 90 degrees to one another. This orientation is common in many touch screen display systems. However, it is to be appreciated that the two or more apparatuses need not necessarily be orientated at approximately 90 degrees to one another.

As mentioned above, one or more collimators such as column apertures, column lenses or directional filter may be used in combination with one or both of emitting waveguide 100 and receiving waveguide 300 to produce a more collimated beam or beams of light. A collimator may be located in any suitable location relative to the waveguide. In at least one embodiment, a collimator may be disposed between an emitting waveguide and a distributed band pass filter. In one embodiment, a collimator may be disposed on the opposite side of the filter so that the filter is positioned between the emitting waveguide and collimator. An example of this latter configuration is shown in FIG. 5 where, for instance, filter 200a is disposed between collimator 600a and emitting waveguide 100a. A collimator may also be employed at a receiving waveguide. In at least one embodiment, a collimator may be disposed in front of a filter at a receiving waveguide, meaning the filter is located between the collimator and the receiving waveguide. An example of this is shown in FIG. 5, where receiving filter 220a is disposed between collimator 620a and receiving waveguide 300a.

Collimating the light at the emitting and/or receiving waveguide may enhance the positional accuracy of the sensing apparatus. In addition, collimating the light may in some embodiments reduce the amount of signal processing required by the apparatus. For example, certain types of distributed band pass filters behave in a certain way with respect to light hitting the filter perpendicularly (zero angle of incidence). As described above, some distributed band pass filters allow light of frequency F to pass through the filter at a certain position along the filter while blocking the light at all other positions. However, with some filters this functionality occurs only when light hits the filter with an approximately zero angle of incidence. When light hits the filter having an approximately non-zero angle of incidence, sometimes light of a particular frequency is allowed to pass through the filter (e.g. leak) at a physical position through which it would not pass if the light had a zero angle of incidence. In other words, some filters allow light to leak through when the light hits the filter at approximately non-zero angles of incidence. This is further explained by means of an example.

The leaking light problem is described with reference to FIG. 7, which shows a cross-sectional view of a sensing apparatus according to the present disclosure. Using an infrared model in the example, light of a certain wavelength from light source 400 is projected into input area 102 of the emitting waveguide 100. The light exits the waveguide at output area 106 and passes through distributed band pass filter 200 at a location or region corresponding to the wavelength of the light. Since filters 200 and 220 are aligned, the light travelling at a zero degree angle of incidence passes through the same axial location on the receiving filter 220 since the band pass location or region is the same as in emitting filter 200. The light from emitting filter 200 illuminates a large region of receiving filter 220 but is generally blocked at all other locations or regions except where the band pass location or region R5 matches the wavelength of light being transmitted.

However, light having the specific wavelength that hits receiving filter 220 with a certain angle of incidence may pass through or "leak" through the filter at a different point or region.

Figure 7:
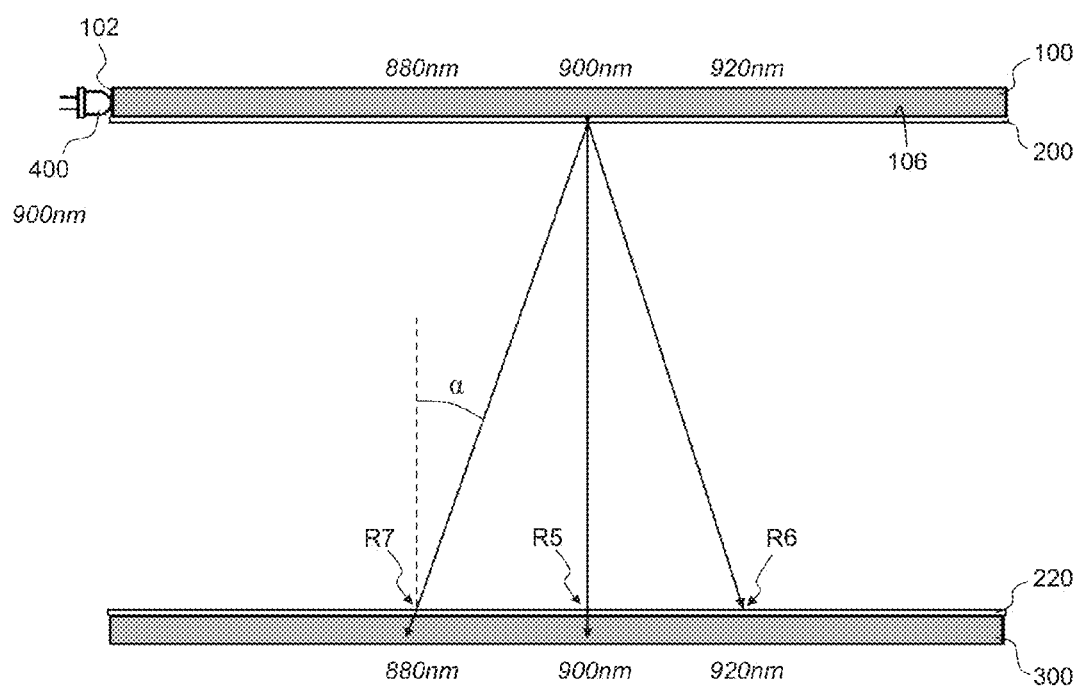
FIG. 7 is a side cross-sectional view of a representation of another embodiment according to the present disclosure illustrating a leaking light problem.

In the example shown in FIG. 7, the center frequency of filters 200 and 220 increases from left to right within the range of 850 to 950 nm. Light injected into the emitting waveguide 100 has a wavelength of 900 nm. The light exits the emitting waveguide midpoint through the filter at the 900 nm position with all other points on the filter being blocked. The light travels across to receiving filter 220 and enters at the same axial point or region R5 as it left the emitting filter and then illuminates receiving waveguide 300 to be decoded for positioning. This is valid only for the light that hits the filter at approximately a zero degree angle of incidence.

If this same 900 nm light hits receiving filter 220 at a positive angle of incidence at any point higher on the band, the filter should still reject the light at all points higher than the 900 nm point as the band pass at those points always has a longer wavelength than 900 nm. The example of the positive angle is shown on the right side of the figure for the 920 nm wavelength band pass at region R6.

However, when the angle is negative (as is shown on the left side of FIG. 7 for the 880 nm band pass, and indicated as a) the situation may be different. The wavelength of the 900 nm incident light would normally be too long for the 880 nm band pass point of the filter, indicated as region R7, and should be blocked. But the centre wavelength of the 880 nm point of the filter shifts to a lower wavelength if receiving light at a negative angle so the filter may become transparent to 900 nm light at the 880 nm region R7 if receiving the 900 nm light at a negative angle α, such as for example −3 or −4 degrees. This may result in an obstruction (e.g. a touch) not be detected since when light is blocked from reaching region R5, light may still enter receiving waveguide 300 through region R7 of receiving filter 220. Therefore a photo detector (not shown) may sense light in the receiving waveguide and thus the obstruction may not be detected.

This leaking light issue is a characteristic of some distributed band pass filters. With such filters, it may be desirable to use of one or more of collimators or angle attenuation filters to restrict the transmission (e.g. at the emitting waveguide side) and/or reception (e.g. at the receiving waveguide side) of off-angle light. However, depending on the design of the distributed band pass filter, the transparency of the filter to such errant angle light may be attenuated already and may provide enough attenuation to differentiate off angle light from valid zero angle light.

In some embodiments, this "leaked" light may be signal processed out by a processor of the system. However, it may not always be desirable to use signal processing to eliminate or compensate for the leaked light. In some embodiments, it may be desirable to use one or more directional filters, such as a collimator, to collimate the light beam to inhibit or reduce angular transmission through the filter, for example as described above.

In addition, in at least one embodiment, light that is to be directed into an emitting waveguide, for example from a light source, may be modified in any suitable manner to give it one or more distinguishing properties. In one embodiment, the light may be strobed so as to distinguish the light from other light not originating from the light source (e.g. such as ambient room light and sunlight). In other words, external light may interfere with the proper operation of the optical sensing apparatus. For example, in one embodiment, light from a light source may be strobed at a single frequency. The strobing of the light may allow for the light from the light source to be distinguished from other light not originating from the light source.

In another embodiment, the light may be modulated or strobed in a manner that corresponds to the particular frequency of the light. The modification of the light may allow for the identification of the frequency of light received at a receiving waveguide without having to detect or determine the frequency of the light itself. In at least one embodiment, the light for each frequency or frequency band within an operational spectrum of an optical sensing apparatus may be strobed at a unique strobe rate. As an example, light having a wavelength of 890 nm may be strobed at a rate of 23.5 kHz, light having a wavelength of 895 nm strobed at a rate of 24.0 kHz, light having a wavelength of 900 nm strobed at a rate of 24.5 kHz, and so on. These values are merely examples and are not limiting. Therefore in one embodiment, a physical position or region along a distributed band pass filter may be associated with both a frequency and a strobe rate. In such an embodiment, a physical location of an obstruction may be determined or calculated using either or both of the frequency and strobe rate of the received light. Thus in at least one embodiment, a location of a non-obstruction may be determined using only a measured strobing frequency of the received light. On the other hand, a location of an obstruction (e.g. a touch) may be determined by detecting an absence (or degraded intensity, brightness, etc.) of received light having the specific strobing frequency.

Light from a light source may be strobed in any suitable way. For example, the light source could itself strobe the light on and off at the desired rate. In another embodiment, a shutter mechanism may be used, for example an LCD shutter mechanism. Other ways of strobing light from the light source are possible.

Any suitable strobe rates and ranges may be used. In at least one embodiment, strobe rates in the kHz range (e.g. 1 to 999 kHz) may be used. In another embodiment, strobe rates in the low kHz range (e.g. 1 to 100 kHz) may be used. However, other ranges and values may be used.

In addition, any suitable type of modulation or waveform may be used, including but not limited to frequency modulation (FM) and amplitude modulation (AM).

The light may be modified by a modifier. In at least one embodiment, the modifier may be part of or integrated with the light source. For example, in an embodiment where the light is strobed, the light source may be configured to output light in a strobed manner. In another embodiment, the modifier may be separate from the light source.

In at least one further embodiment, a static spectral output light source that simultaneously outputs a broad spectrum of light may be used instead of a tunable output light source, which only outputs light of a single frequency or narrow frequency band at any given moment. For example, a light source may output a spectrum spanning 850 nm to 950 nm. This range is merely an example and is not meant to be limiting. Therefore rather than detecting the presence, intensity, etc. of light of a specific frequency at a photo detector, here a received spectrum of light is examined on the receiving side of an optical sensing apparatus to determine if one or more frequencies or frequency bands of light from the emitted spectrum are absent.

Figure 8:
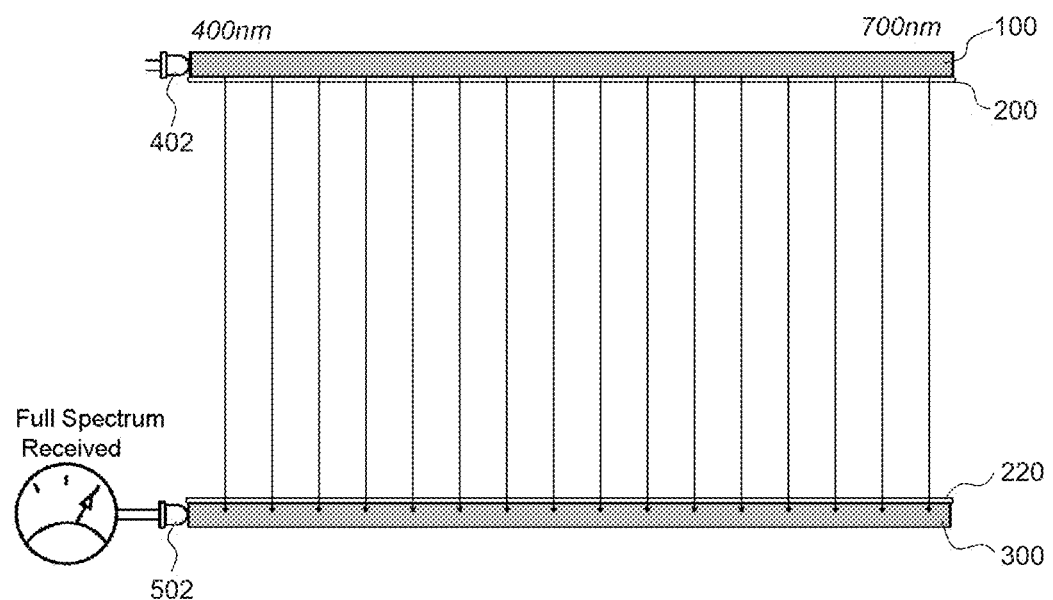
FIG. 8 is a side cross-sectional view of a representation of another embodiment according to the present disclosure comprising a static broad spectrum light source.

An example of an optical sensing apparatus comprising a static spectral output light source is shown in FIG. 8. Such an embodiment may comprise opposing emitting and receiving waveguides 100 and 300, as well as emitting and receiving distributed band pass filters 200 and 220. The waveguides and filters may be similar to those described above in relation to other embodiments. In addition, it may include light source 402 and photo detector 502. However, rather than light source 402 emitting only a specific frequency or narrow frequency band of light, the static spectral output light source emits a spectrum of light. For descriptive purposes, light source 402 in the present example emits light within a visible spectrum of 400 nm (violet) to 700 nm (red). Again, this specific spectrum is used for descriptive purposes and is not limiting. In some embodiments, light outside of the visible spectrum may be used so as not to cause visual interference with an image displayed on a screen. Turning back to the present example, the 400-700 nm spectrum may substantially correspond to the spectrums of the distributed band pass filters 200 and 220. The plurality of lines extending between waveguides 100 and 300 shown in FIG. 8 represents light of different frequencies (wavelengths). The lines are used for illustrative purposes. In reality, a continuous spectrum of light may extend between the respective waveguides.

In the example, light source 402 emits a substantially white light into emitting waveguide 100. Emitting distributed band pass filter 200 breaks up the white light into constituent frequencies before the light travels to receiving waveguide 300 since at a specific point or region in the filter 200, only light of a specific frequency or small frequency band can pass through the filter at that point. Thus in this example, the light traveling between the waveguides 100, 300 forms a rainbow. The component colors of the rainbow pass through receiving waveguide 220, each at their corresponding points or regions along the filter, and are reconstituted back into white light in receiving waveguide 300. Accordingly, photo detector 502 detects the full spectrum of light that was emitted from emitting filter 200.

Figure 9:
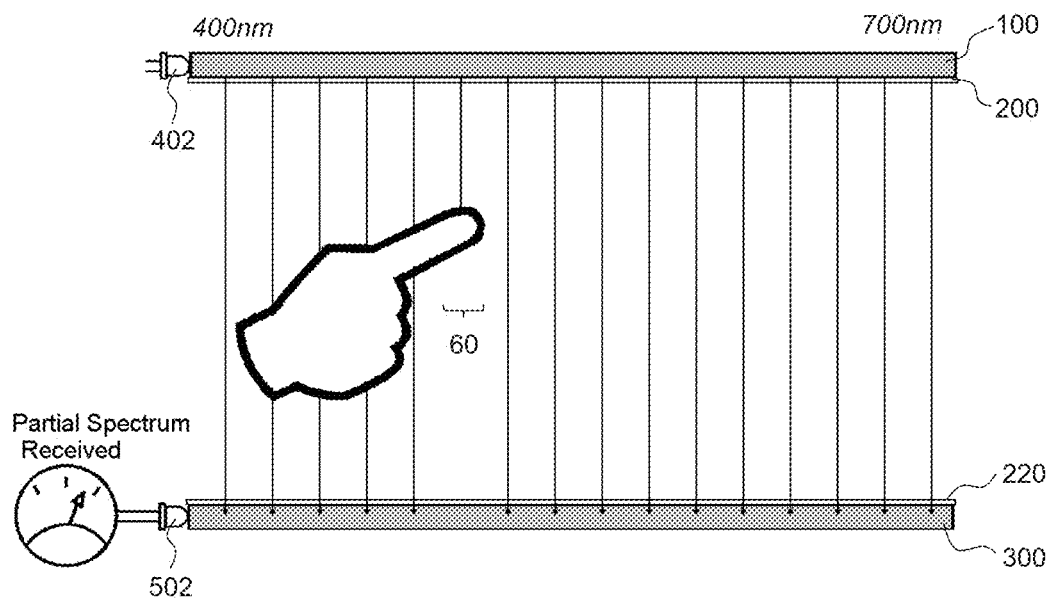
FIG. 9 is the same view of the embodiment shown in FIG. 8 except in that some light traveling between the waveguides is obstructed.

FIG. 9 shows the embodiment of FIG. 8 when an obstruction, such as a touch, is present between the waveguides 100, 300. The obstruction may obstruct light of a particular frequency or narrow frequency band 60. In the example, the touch may obstruct light in the range of 510 nm to 525 nm, which has a greenish color. Accordingly, the light received into receiving waveguide 300 will span the 400-700 nm spectrum emitted at the emitting waveguide, but will be missing the 510 nm to 525 nm band since it was blocked by the obstruction. Thus only a partial spectrum of light is received and detected at photo detector 502. Since axial positions along the filters correspond to specific frequencies of light, as is the case with the other embodiments described above, an axial position of the obstruction may then be calculated or determined.

The values and ranges used above and shown in FIGS. 8 and 9 are merely examples and are not intended to be limiting.

The one or more missing frequencies or frequency bands in a received spectrum of light may be detected or determined in any suitable way. In at least one embodiment, a spectrum analyzer circuit such as, but not limited to, a charge-coupled device (CCD) chip or similar device (e.g. an interferometer or diffraction grating making use of a photodiode array) that measures the color of the received light to be able to determine which component color of light is missing. This information may then be used to calculate or determine a position of the obstruction(s).

In at least another embodiment, a photodiode, photo transistor or equivalent device whose photo sensitivity varies with the color of light that it is exposed to may be used to detect or determine the one or more missing frequencies or frequency bands. For example, some photodiodes and resistors have a changing efficiency performance that varies with the color of light that it receives. Thus a photodiode may be used to determine a missing frequency or frequency band of light by measuring a change in the light to which the diode is exposed. The photo sensitivity of some photodiodes varies substantially linearly though certain spectrums of light. For example, some photodiodes may have a substantially linear response in the spectrum of interest. Other photodiodes may have a linear curve response in the lower frequencies of the operating band width and have a nonlinear response or no response in the higher end of the operating band. Other photodiodes may have an opposite response, meaning a linear response in the higher end of the operating band and a nonlinear response in the lower end. Thus, in one embodiment, for example, a photodiode with a linear response in the lower end and a photodiode with a linear response in the higher end may be used in combination. Such a combination may allow provide for a substantially linear response across most of or the entire operating spectrum. However, other types and/or configurations of photodiodes are possible.

Using such photodiodes may simplify the process of accurately determining a missing frequency or frequency band of light in a spectrum received at the photodiode by comparing the output of a touch event color to that of a non-touch full spectrum output. Again, this information may then be used to calculate or determine a position of the touch or other obstruction(s).

One or more of the apparatuses described herein may comprise one or more processors for performing various functions and calculations. For example, a processor may be used for one or more of controlling the output of the light source (e.g. amplitude and/or frequency), for receiving measurements or other signals from a photo detector, and for determining or calculating an axial position of an obstruction of light between an emitting waveguide and a receiving waveguide. As will be appreciated, the one or more processors may be used for other functions.

Furthermore, one or more embodiments may comprise one or more memories. FIG. 1 shows an embodiment including a computing device 1100 comprising a processor 1102 and a memory 1104. Computing device 1100 may be connected to one or both of light source 400 and photo detector 500. The computing device may in turn be connected to another device or computer, such as for example a display with which the touch input system is combined.

In one or more embodiments, two or more waveguides, filters, etc. may be arranged in a suitable manner to provide for scalability. For example, two or more emitting waveguides may be arranged in an endwise side-by-side fashion to provide for a larger overall emitting waveguide. Similarly, two or more emitting filters may be arranged in a endwise side-by-side fashion to provide a larger overall emitting filter. Other options for providing scalability are possible. In at least one embodiment, using and combining or arranging similar components for scalability can reduce or eliminate a sacrifice of resolution that may occur if the size of a component was merely increased or stretched out.

Furthermore, in at least one embodiment, one or more waveguides may be positioned at a perimeter of an input device, such as a display. The one or more waveguides may be mounted in place in any suitable way, including but not limited to mounting to a frame (an example is shown in FIG. 6) or to a substrate panel (an example is shown in FIG. 4). In at least one embodiment, one or more waveguides may be mounted to a suitably dish-shaped glass or plastic window. Such "touch windows" are commonly used as the entire front face of a device such as a cell phone or medical patient monitor and allows the equipment to be designed with a continuous front face surface with no bezels or borders that may need to be sealed from moisture. Such designs are sometimes desirable in cell phones as they may be aesthetically pleasing and may also simplify manufacturing. In medical equipment, an absence of bezels framing the touch screen is often desirable as the bezels, corners or stepped surfaces can trap contaminants. The absence of a bezel, etc. can also make the equipment much easier to clean.

Methods consistent with the teachings of the present disclosure are also contemplated.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment.

Furthermore, additional features and advantages of the present disclosure will be appreciated by those skilled in the art.

In addition, the embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Moreover, the previous detailed description is provided to enable any person skilled in the art to make or use the present invention. Various modifications to those embodiments will be readily apparent to those skilled in the art, and the generic principles defined herein may be applied to other embodiments without departing from the spirit or scope of the invention described herein. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

What is claimed:

1. An apparatus comprising:
    an emitting optical waveguide comprising an input area and an output area;
    a tunable light source for projecting light at the input area of the emitting waveguide, the tunable light source being controllable to perform scanning comprising cycling through a plurality of different frequencies of projected light;
    an emitting distributed band pass filter disposed at the output area of the emitting optical waveguide;
    a receiving optical waveguide comprising an input area and an output area, the receiving optical waveguide disposed at a spaced apart location from the emitting optical waveguide and orientated such that when light exits the output area of the emitting optical waveguide light is directed at the input area of the receiving optical waveguide;
    a receiving distributed band pass filter disposed at the input area of the receiving optical waveguide, wherein for each of the emitting and receiving distributed band pass filters, the position along the filter through which light passes changes with the change in the frequency of the light;
    a photo detector for detecting light exiting the output area of the receiving waveguide; and
    a processor for determining an axial position of an obstruction obstructing light travel between the emitting and receiving distributed band pass filters based on the detection of reduced light at the photo detector and on the specific frequency of light projected by the light source when the reduced light is detected.

2. The apparatus of claim 1 further comprising a modifier for modifying light from the light source before it enters the emitting waveguide so that the light is distinguishable from light not originating from the light source detected at the photo detector.

3. The apparatus of claim 2 wherein the modifier is capable of strobing the light from the light source.

4. The apparatus of claim 3 wherein the modifier is capable of strobing the light at various frequencies, where a specific strobing frequency corresponds to a specific frequency band of the light.

5. The apparatus of claim 1 wherein at least one of the emitting and receiving distributed band pass filters is a linear distributed band pass filter.

6. The apparatus of claim 1 wherein the emitting and receiving distributed band pass filters are aligned such that the center wavelengths of operation of the filters are substantially directly opposite one another.

7. The apparatus of claim 1 further comprising at least one of a collimator at the emitting waveguide for collimating light exiting the emitting waveguide and a collimator at the receiving waveguide for collimating light entering the receiving waveguide.

8. The apparatus of claim 7 wherein the at least one collimator comprises a collimator disposed at the receiving waveguide to collimate light prior to it reaching the receiving distributed band pass filter.

9. A method comprising:
    projecting light of a specific frequency from a tunable light source into an input area of an emitting optical waveguide;
    changing the frequency of the projected light over time;
    filtering light exiting an output area of the emitting waveguide using an emitting optical distributed band pass filter;
    filtering light at a spaced apart location from the emitting waveguide using a receiving optical distributed band pass filter, wherein for each of the emitting and receiving distributed band pass filters, the position along the filter through which light passes changes with the change in the frequency of the light;
    receiving light that has passed through the receiving distributed band pass filter with a receiving optical waveguide;
    detecting light exiting the output area of the receiving waveguide; and
    determining an axial position of an obstruction obstructing light traveling between the emitting and receiving distributed band pass filters based on the detection of reduced light exiting the output area of the receiving waveguide and on the specific frequency band of light projected by the light source when the reduced light is detected.

10. The method of claim 9 further comprising, prior to the filtering light exiting the output area of the emitting waveguide, modifying light from the light source so that the light is distinguishable from light not originating from the light source.

11. The method of claim 10 wherein the modifying includes strobing the light.

12. The method of claim 11 wherein the strobing includes strobing the light at various frequencies, where a specific strobing frequency corresponds to a specific frequency band of the light.

13. The method of claim 9 further comprising collimating the light after it has exited the emitting waveguide and prior to it reaching the receiving distributed band pass filter.

14. A method comprising:
projecting a spectrum of light from a light source into an input area of an emitting optical waveguide;
filtering light exiting an output area of the emitting waveguide using an emitting optical distributed band pass filter;
filtering light at a spaced apart location from the emitting waveguide using a receiving optical distributed band pass filter, wherein for each of the emitting and receiving distributed band pass filters, the position along the filter through which light passes changes with the change in the frequency of the light;
receiving light that has passed through the receiving distributed band pass filter with a receiving optical waveguide;
detecting light exiting the output area of the receiving waveguide; and
determining an axial position of an obstruction obstructing light traveling between the emitting and receiving distributed band pass filters based on the detection of light exiting the output area of the receiving waveguide, the determining involving determining a frequency band of light that is absent in the light received at the receiving waveguide relative to a spectrum of light emitted from the emitting waveguide.

15. The method of claim 14 further comprising, prior to the filtering light exiting an output area, modifying light from the light source so that the light is distinguishable from light not originating from the light source.

16. The method of claim 15 wherein the modifying includes strobing the light.

17. The method of claim 15 further comprising collimating the light after it has exited the emitting waveguide and prior to it reaching the receiving distributed band pass filter.

* * * * *